US011671385B1

(12) United States Patent
Contractor et al.

(10) Patent No.: US 11,671,385 B1
(45) Date of Patent: Jun. 6, 2023

(54) AUTOMATED COMMUNICATION EXCHANGE PROGRAMS FOR ATTENDED ROBOTIC PROCESS AUTOMATION

(71) Applicant: International Business Machines Corporation, Armonk, NY (US)

(72) Inventors: Danish Contractor, New Delhi (IN); Ateret Anaby-Tavor, Haifa (IL); Gaurav Pandey, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/544,449

(22) Filed: Dec. 7, 2021

(51) Int. Cl.
*G06F 15/16* (2006.01)
*H04L 51/02* (2022.01)
*G06N 20/00* (2019.01)
*G06F 9/451* (2018.01)

(52) U.S. Cl.
CPC .............. *H04L 51/02* (2013.01); *G06F 9/451* (2018.02); *G06N 20/00* (2019.01)

(58) Field of Classification Search
None
See application file for complete search history.

(56) References Cited

U.S. PATENT DOCUMENTS

| | | | | |
|---|---|---|---|---|
| 8,799,000 B2* | 8/2014 | Guzzoni | ............ | G06F 16/3344 709/224 |
| 9,008,283 B2 | 4/2015 | Kiahi et al. | | |
| 9,276,802 B2 | 3/2016 | Lynch et al. | | |
| 9,576,574 B2* | 2/2017 | van Os | ................... | G10L 15/22 |
| 9,647,968 B2 | 5/2017 | Smullen et al. | | |
| 9,659,298 B2 | 5/2017 | Lynch et al. | | |
| 9,848,082 B1 | 12/2017 | Lillard et al. | | |
| 10,276,170 B2* | 4/2019 | Gruber | ................... | G06F 3/167 |

(Continued)

FOREIGN PATENT DOCUMENTS

| | | |
|---|---|---|
| CA | 2917294 C | 9/2014 |
| WO | 2021034392 A1 | 2/2021 |

OTHER PUBLICATIONS

Wikipedia, Cobot, https://en.wikipedia.org/w/index.php?title=Cobot&oldid=1058285287, Dec. 2, 2021.

(Continued)

*Primary Examiner* — Phuoc H Nguyen
(74) *Attorney, Agent, or Firm* — Ryan, Mason & Lewis, LLP

(57) ABSTRACT

Methods, systems, and computer program products for implementing automated communication exchange programs for attended robotic process automation are provided herein. A computer-implemented method includes invoking, during a user communication associated with an attended robotic process automation context, at least one automated communication exchange program in response to at least one user input; determining, using the at least one automated communication exchange program, information directed to the at least one user input; carrying out, using the at least one automated communication exchange program, at least a portion of the user communication subsequent to determining the information directed to the at least one user input; and performing one or more automated actions in connection with automatically carrying out the at least a portion of the user communication.

18 Claims, 6 Drawing Sheets

(56) References Cited

U.S. PATENT DOCUMENTS

| | | | |
|---|---|---|---|
| 10,341,488 | B2 | 7/2019 | Munns et al. |
| 10,671,815 | B2 * | 6/2020 | Reiter ................. G08B 5/22 |
| 10,853,568 | B2 | 12/2020 | Chittari et al. |
| 11,341,335 | B1 * | 5/2022 | Crook ............. G06F 16/3329 |
| 2018/0054464 | A1 | 2/2018 | Zhang et al. |
| 2019/0171438 | A1 * | 6/2019 | Franchitti ............ G06N 20/00 |
| 2021/0160373 | A1 * | 5/2021 | McGann ............... G06F 40/30 |
| 2021/0358032 | A1 * | 11/2021 | Cella .................. G06K 9/6218 |
| 2022/0019959 | A1 * | 1/2022 | Roy .................... G06Q 10/103 |
| 2022/0059097 | A1 | 2/2022 | Lavi et al. |
| 2022/0284890 | A1 | 9/2022 | Contractor et al. |
| 2022/0292699 | A1 * | 9/2022 | Zhu ..................... G06N 20/00 |

OTHER PUBLICATIONS

Serban et al., (Feb. 2017). A hierarchical latent variable encoder-decoder model for generating dialogues. In Proceedings of the AAAI Conference on Artificial Intelligence (vol. 31, No. 1).

Park et al., (Jun. 2018). A Hierarchical Latent Structure for Variational Conversation Modeling. In Proceedings of the 2018 Conference of the North American Chapter of the Association for Computational Linguistics: Human Language Technologies, vol. 1 (Long Papers) (pp. 1792-1801).

Radford et al., (2019). Language models are unsupervised multitask learners. OpenAI blog, 1(8), 9.

Lowe et al., (2017). Training end-to-end dialogue systems with the ubuntu dialogue corpus. Dialogue & Discourse, 8(1), 31-65.

Devlin et al., (Jan. 2019). BERT: Pre-training of Deep Bidirectional Transformers for Language Understanding. In NAACL-HLT (2019).

Gu et al., (Oct. 2020). Speaker-aware bert for multi-turn response selection in retrieval-based chatbots. In Proceedings of the 29th ACM International Conference on Information & Knowledge Management (pp. 2041-2044).

Whang et al., (Oct. 2020). An Effective Domain Adaptive Post-Training Method for BERT in Response Selection. In Interspeech (pp. 1585-1589).

Hugging Face Library https://huggingface.co/ , accessed Dec. 7, 2021.

Subramaniam et al., COBOTS—A Cognitive Multi-Bot Conversational Framework for Technical Support, AAMAS 2018, Jul. 10-15, 2018.

IP.com, Embedded Bot Assistance for Creative Tasks, Nov. 25, 2016.

IP.com, Conversational Bots for Advertisements, Dec. 14, 2017.

\* cited by examiner

AUTOMATED COMMUNICATION EXCHANGE PROGRAMS FOR ATTENDED ROBOTIC PROCESS AUTOMATION

BACKGROUND

The present application generally relates to information technology and, more particularly, to automated communication exchange technology. Conventional user support and/or self-help chatbots (that is, automated software programs configured to communicate with one or more users (e.g., respond to user queries, engage in conversation with users, etc.)) transfer control of a communication to a human agent once the conversation with the given user breaks down. Such breakdowns can occur, for example, due to an unsupported or misidentified intent, a missing entity or entity value, an incorrect condition, an incorrect response, etc. In any event, in conventional approaches, once the user is transferred to an agent, control typically does not go back to the chatbot.

This can often lead to issues such as agents being occupied for tasks that could have been handled by a chatbot, delays surrounding a compound task that requires passive agent intervention while the agent is actively occupied elsewhere, etc.

SUMMARY

In at least one embodiment, techniques for implementing automated communication exchange programs for attended robotic process automation (RPA) are provided. An example computer-implemented method includes invoking, during a user communication associated with an attended robotic process automation context, at least one automated communication exchange program in response to at least one user input, and determining, using the at least one automated communication exchange program, information directed to the at least one user input. The method also includes carrying out, using the at least one automated communication exchange program, at least a portion of the user communication subsequent to determining the information directed to the at least one user input, and performing one or more automated actions in connection with automatically carrying out the at least a portion of the user communication.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
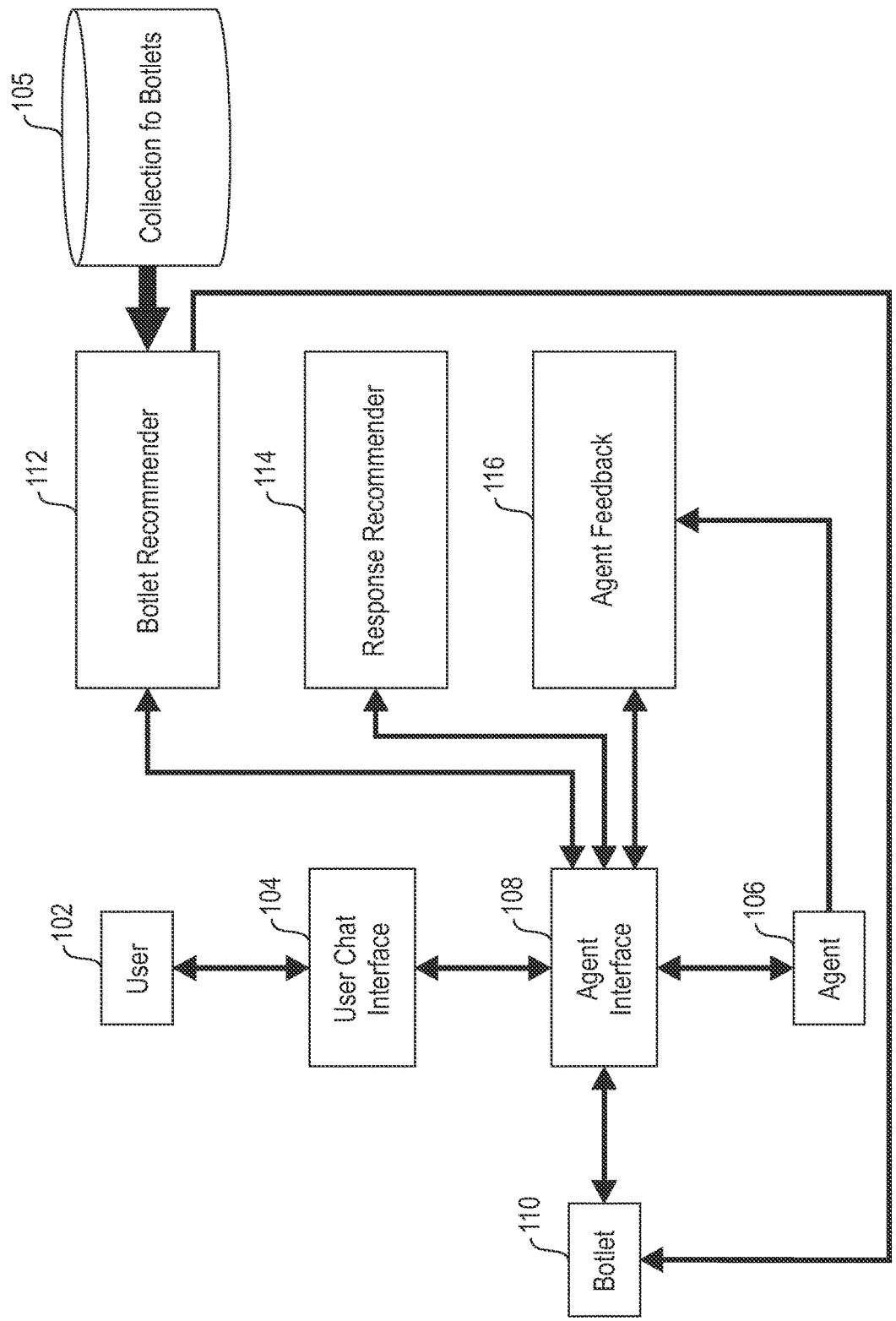
FIG. 1 is a diagram illustrating system architecture, according to an example embodiment of the invention.

As described herein, at least one embodiment includes implementing automated communication exchange programs for attended RPA. As detailed herein, such automated communication exchange programs can also be referred to as botlets or conversational botlets. As used herein, botlets, a parallel to one or more functions in programming, include one or more self-contained chat routines that can accomplish at least one sub-task in a larger conversation.

One or more embodiments include defining and implementing one or more botlets that can interact with back-end systems and/or other invocation targets using one or more application programming interfaces (APIs). Such an embodiment can also include learning the invocation(s) of the one or more botlets from information sources including chat logs, a collection of botlets, etc. Additionally, such an embodiment includes at least a portion of the botlets interacting with one or more live and/or human agents passively and actively by providing text-to-speech (TTS) updates, notifications, agent-override capabilities, and/or other system elements for enabling features that include delay settings for botlet execution speed. Further in one or more embodiments, at least one of the botlets can ultimately converse with the given user(s).

Accordingly, and as further detailed herein, at least one embodiment includes generating and/or implementing (or recommending) one or more botlets to execute at least a partial conversation on behalf of an agent. For example, such a botlet can be implemented in furtherance of information gathering and verification within a conversation, wherein the botlet determines and shares (with the agent and/or user) results from an information system (structured or unstructured), etc.

By way merely of illustration, consider an example use case wherein a communication (e.g., a communication between a user and a chatbot) is transferred to an agent in connection with a user request for a payment extension. Additionally, assume that such a payment extension requires verification of the user's billing addresses and account number, and/or some other form of identification (ID) on file. Instead of being recommended responses from the given chatbot and/or system, the agent could obtain one or more recommended botlets, which would execute the task(s) of conversing with the user to gather relevant information and executing a back-end API call to return the result of the verification. Once done, the agent is notified and can continue the conversation and/or follow-up actions. Additionally or alternatively, in one or more embodiments, the botlet(s) may communicate directly with the user to finish the request resolution with suitable notification to the agent.

In at least one embodiment, the degree of involvement (in such a botlet-based sequence of events as detailed in the above example) of an agent may be specified, for example, at the botlet level (e.g., depending on the difficulty of the task), based on one or more user parameters, and/or based on one or more other configurable parameters determined during deployment of the botlet(s). Such varying degrees of agent involvement can include aspects such as, for example, the frequency and strength of notification (e.g., modal notification versus pop-up, etc.).

As detailed herein, a botlet can be implemented in multiple ways. For example, similar to modeling an intent and its corresponding dialog flow, a botlet can be implemented in connection with supporting API invocation and/or can be bootstrapped from conversation logs. At least one embodiment can also include using one or more retrieval, generative, and/or hybrid models with API query support. Additionally or alternatively, one or more embodiments can include implementing botlets as a variant of dialog shortcuts designed for agents, for example, if agents are to be given more control, and/or personalized botlets.

FIG. 1 is a diagram illustrating system architecture, according to an embodiment of the invention. By way of illustration, FIG. 1 depicts an agent 106 communicating with a user 102 via agent interface 108 and user chat interface 104. Additionally, the agent 106, via agent interface 108, interacts with automated system components including botlet recommender 112 and response recommender 114, as well as with botlet 110. As also depicted in FIG. 1, botlet recommender 112 determines and/or identifies at least one suitable botlet (e.g., botlet 110) from the collection of botlets 105 and/or by processing data from the user chat (e.g., capture via agent interface 108). Also, response recommender 114 generates, based at least in part on chat history, at least one response and forwards the same to agent interface 108. In one or more embodiments, botlet recommender 112 recommends a botlet (here, botlet 110) for execution to the agent 106 via agent interface 108, while the response recommender 114 recommends a response for the consideration of the agent 106 (e.g., the agent 106 may choose to use the recommendation and send it to the user as a response).

Accordingly, in one or more embodiments, botlet 110 can communicate directly with user (e.g., using agent interface 108). In such an embodiment, the agent 106 can passively and/or actively monitor such user-botlet communication. In such an embodiment, botlet 110 and response recommender 114 can learn from agent intervention and/or agent feedback 116. Ultimately, the agent 106 can be notified (e.g., by botlet 110) when the botlet 110 finishes execution (e.g., finishes at least a portion of the communication with user 102).

As detailed in connection with FIG. 1, one or more embodiments include learning Botlet invocation (that is, recommending one or more botlets to agents). For example, given a collection of predefined botlets (for example, compiled and/or generated as a byproduct of developing chatbots or chatbot skills (e.g., an account balance botlet, a top-up phone botlet, etc.) and a collection of conversation logs, botlet invocation can be discovered by training a botlet recommender (e.g., component 112 in FIG. 1) in an unsupervised setting. Training input can include communication and/or chat logs and botlet intents. As used herein, a botlet intent refers to the goal and/or objective of a botlet (e.g., what sub-task the botlet is designed to accomplish (for example, gathering customer data, verifying users, etc.)). Training methods can include, for example, one or more machine learning techniques that can learn latent botlet invocations from output responses. For instance, at least one embodiment can include using reinforcement learning (RL)

wherein an objective includes minimizing the difference from reference responses (with appropriate masking, for example).

Also, because botlets, in one or more embodiments, are commonly to be executed for repetitive sub-tasks and/or sub-conversations, such responses are likely to be consistent and thus training will not have convergence issues. Note, also, that in one or more embodiments, there is no assumption that the text in conversations has to match exactly with botlet responses.

Once botlet invocation has been learned and/or determined, the recommended botlet(s) (e.g., botlet 110 in FIG. 1) can be plugged into existing agent-assist interfaces (e.g., agent interface 108 in FIG. 1) and when engaged (e.g., clicked on by the agent), the botlet(s) can be execute on behalf of the agent and can notify the agent once executed. In at least one embodiment, the agent can intervene at any point during the execution of the botlet (e.g., to override a system response, if the user responds with something that is beyond the scope of the botlet., etc.). Such human interventions can be captured as feedback (e.g., agent feedback 116) and used to modify and/or improve the botlet and/or the botlet recommender/invocation process.

By way of illustration, consider an example embodiment which includes training for a botlet invocation process. Input for such training can include a collection of real-world user-agent chatlogs and a collection of invocable botlets (which can be implemented, for example, as small dialog flows (e.g., action steps in a virtual agent and/or chatbot)). Such an embodiment can also include learning an invocation model (i.e., a training procedure), wherein at each turn in a given user communication and/or conversation, the choice between generation (reward $C_g$) and invocation (reward $C_i$) from a set of botlets (B) is modeled. By way of example, reward $C_g$ can represent the reward for predicting the given generated response, while reward $C_i$ can represent the reward for invoking the appropriate botlet.

Figure 2:
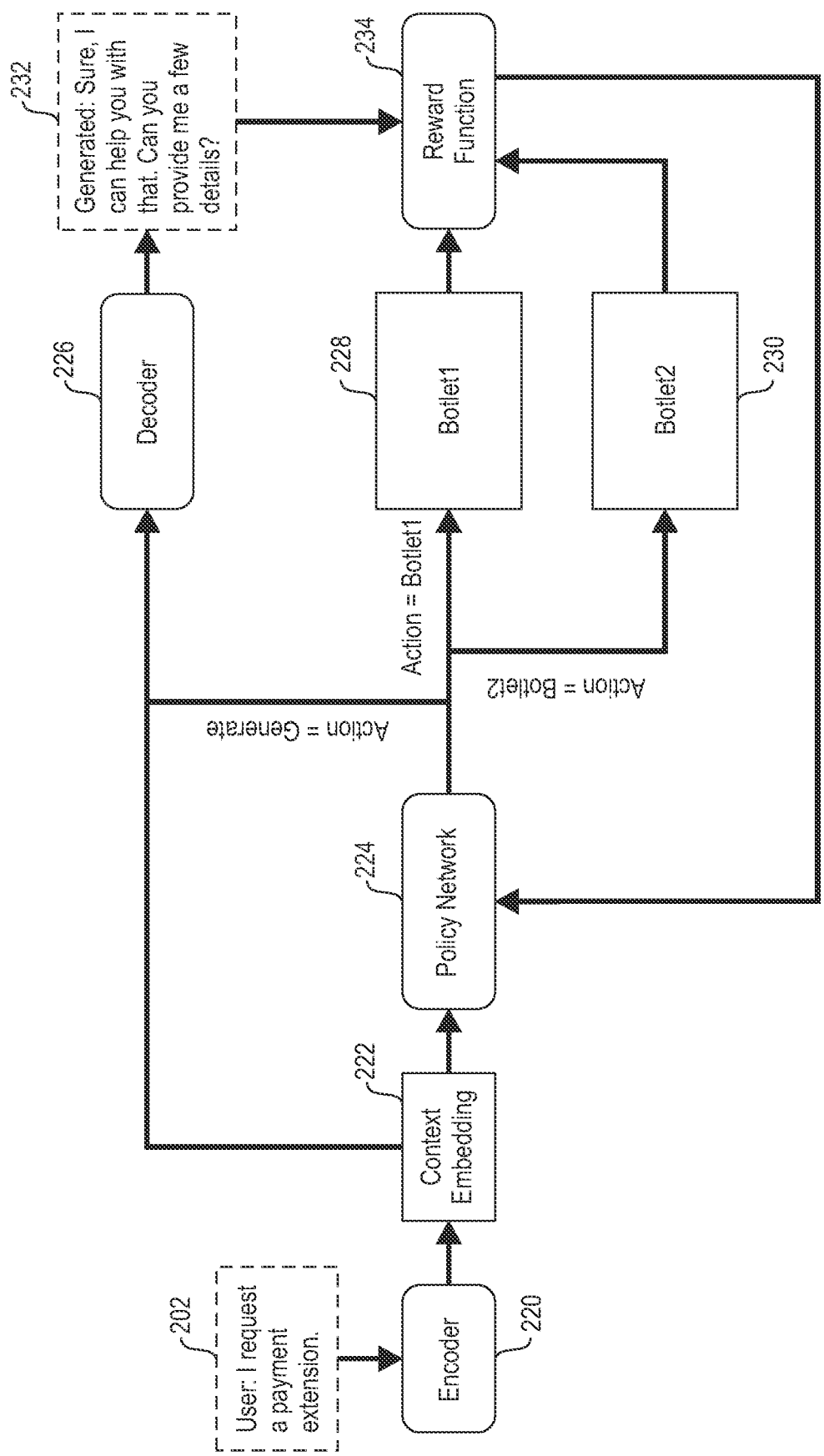
FIG. 2 is a diagram illustrating system architecture, according to an example embodiment of the invention.

FIG. 2 is a diagram illustrating system architecture, according to an example embodiment of the invention. By way of illustration, encoder 220 encodes a dialog context from language such as language 202 to create a representation of the dialog context, also referred to as context embedding 222 in FIG. 2. In machine learning models, such a context embedding 222 can be represented as a vector and/or tensor. As also depicted in FIG. 2, decoder 226 uses the representation (e.g., context embedding 222) created by encoder 220 (in conjunction, in one or more embodiments, with intermediate representations in encoder 220) to convert and/or map the vector(s) and/or tensor(s) into an output, such as a text output 232 in the FIG. 2 embodiment.

Additionally, policy network 224 represents a component that learns the actions to be taken and/or the botlet(s) to be used and/or executed using the context embedding 222 and the reward (e.g., a score of goodness) returned by reward function 234. As also further detailed herein, reward function 234 can include at least one equation for determining a reward based at least in part on the output 232 generated by decoder 226 and/or actions taken by botlet 228 and/or botlet 230.

In connection with the example embodiment depicted in FIG. 2 and detailed herein, an expected reward =p(generate|context)* reward(generated)+$\Sigma_{botlet\ i}$p(botlet i|context) *reward(botlet i). Referring again to FIG. 2, in at least one embodiment, given a dialog context (i.e., the sequence of utterances so far in a given conversation), the policy network 224 outputs p(generate|context) as well as p(botlet i|context) for each botlet. These probabilities correspond to the probability of generating a response, or selecting one of the predefined botlets, respectively. The reward function 234 assigns a reward for each possible action that can be taken by policy network 224. Specifically, reward function 234 outputs a reward for generating the response (reward(generated)), as well as a reward for selecting one of the predefined botlets (reward(botlet i)). The expected reward can then be computed using the above-noted equation. Additionally, in such an embodiment, the model can be trained end-to-end using reinforcement learning.

Additionally or alternatively, in one or more embodiments, the network for recommending botlets can also be trained with supervised chat logs annotated with botlet invocations. In such an embodiment utilizing supervised data (e.g., chat logs with annotations), it is not necessary to train a policy network (e.g., element 234 in FIG. 2); rather, such an embodiment can include directly training a botlet recommender (e.g., element 112 in FIG. 1).

As also detailed herein (e.g., via element 234 in FIG. 2), at least one embodiment includes implementing a reward function. In such an embodiment, a bilingual evaluation understudy (BLEU) score can be used for computing a reward function. For example, given a conversation ($u_1$, $r_1, \ldots, u_m, r_m$) from the conversation logs, at the $t^{th}$ turn, one or more embodiments include determining reward(generated)=BLEU(generated, $r_t$), wherein $r_t$ is the response at $t^{th}$ turn. To compute the reward of a botlet, such an embodiment includes executing the botlet by following the user utterances of the conversation, and determining reward(botlet i)=BLEU($\oplus a_{ik}$, $\oplus r_{t+k}$), wherein $(a_{ik})_{k \geq 1}$ are the agent utterances in the execution trace of the $i^{th}$ botlet.

With respect to botlet execution, agents can, for example, observe the execution of a botlet and/or override a botlet response. This can be carried out, for instance, via configurable delay timers (e.g., delay timers set at 2-3 seconds) when the agent is monitoring the execution of the botlet. In such an embodiment, the botlet can render a preview of what the botlet is going to say to the user, and if the agent does not like it, the agent can override the response. Such action by the agent can then also serve as feedback for the botlet recommendation model, resulting in the creation of one or more new botlets or updates to one or more existing botlets.

Additionally, in one or more embodiments, the confidence associated with botlet invocation will increase over time, and such confidence levels can be indicated, for example, via color-coding and/or numeric scores. In at least one embodiment, only botlet invocations associated with a confidence level above a given threshold (e.g., a user-defined threshold) are executed by agents. Further, in such an embodiment, an agent can be notified any time during the execution of a given botlet that the user says something outside the scope of the given botlet, and the confidence associated with responses being returned by the botlet can be generated and/or monitored.

In at least one embodiment, once a botlet executes (e.g., completes the task(s) associated therewith), control of the user communication may be returned to the agent. Botlet execution can include implementing a TTS layer to which the agent can be passively listening (e.g., while working on other tasks, improving user throughput). Also, in one or more embodiments, users conversing with an agent can be notified that they (i.e., the users) are temporarily being serviced for an automated agent (i.e., by one or more botlets) during botlet execution.

At least one embodiment can also include bootstrapping one or more botlets. For example, in the case of a system (e.g., a dialog framework) with no existing botlets, bootstrapping can include discovering botlets. In one or more embodiments, discovering botlets can include using at least one cluster-and-study tool for implementation in a given dialog framework by at least one bot designer.

Figure 3:
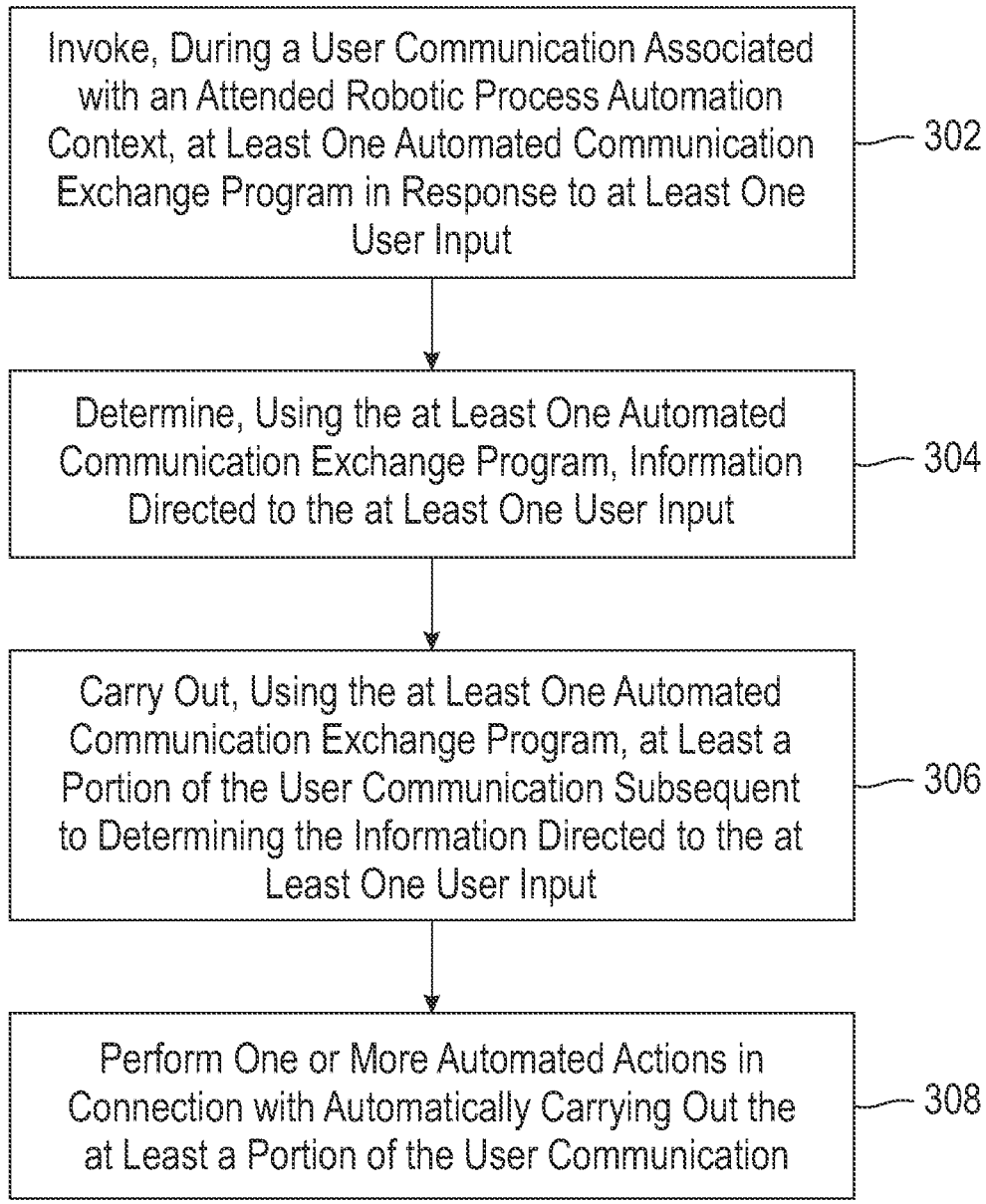
FIG. 3 is a flow diagram illustrating techniques according to an example embodiment of the invention.

FIG. 3 is a flow diagram illustrating techniques according to an embodiment of the present invention. Step 302 includes invoking, during a user communication associated with an attended robotic process automation context, at least one automated communication exchange program (also referred to herein as a botlet) in response to at least one user input. In at least one embodiment, invoking the at least one automated communication exchange program includes processing at least a portion of one or more historical communication logs and data pertaining to a collection of one or more automated communication exchange programs. In such an embodiment, processing can include processing the at least a portion of one or more historical communication logs and the data pertaining to a collection of one or more automated communication exchange programs using one or more machine learning techniques. Further, using one or more machine learning techniques can include processing the at least a portion of one or more historical communication logs and the data pertaining to a collection of one or more automated communication exchange programs using reinforcement learning. Also, one or more embodiments can include training the one or more machine learning techniques based at least in part on one of the determined information directed to the at least one user input and results of carrying out the at least a portion of the user communication.

Additionally or alternatively, processing can include processing the at least a portion of one or more historical communication logs and the data pertaining to a collection of one or more automated communication exchange programs using one or more retrieval models (e.g., dual encoder, BERT-based methods, etc.) with application programming interface query support and/or one or more generative models (e.g., hierarchical recurrent encoder-decoder (HRED), variational hierarchical conversation recurrent neural network (RNN) (VHCR), generative pre-trained transformer 2 (GPT-2), etc.) with application programming interface query support.

Step 304 includes determining, using the at least one automated communication exchange program and, optionally, one or more application programming interfaces (e.g., pertaining to one or more backend systems and/or information sources), information directed to the at least one user input. Step 306 includes carrying out, using the at least one automated communication exchange program, at least a portion of the user communication subsequent to determining the information directed to the at least one user input. In one or more embodiments, carrying out the at least a portion of the user communication includes configuring the at least one automated communication exchange program with one or more delay settings associated with execution speed of the at least one automated communication exchange program.

Step 308 includes performing one or more automated actions in connection with automatically carrying out the at least a portion of the user communication. In at least one embodiment, performing one or more automated actions includes providing one or more text-to-speech formatted updates, pertaining to the automatic carrying out of the at least a portion of the user communication, to at least one agent associated with the user communication. Additionally or alternatively, performing one or more automated actions can include enabling agent-override capabilities during the at least a portion of the user communication being carried out using the at least one automated communication exchange program. Further, in one or more embodiments, performing one or more automated actions includes training the at least one automated communication exchange program based at least in part on feedback, from at least one of one or more agents associated with the user communication and one or more communication logs, pertaining to the at least a portion of the user communication being carried out using the at least one automated communication exchange program.

Additionally, in at least one embodiment, software implementing the techniques depicted in FIG. 3 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
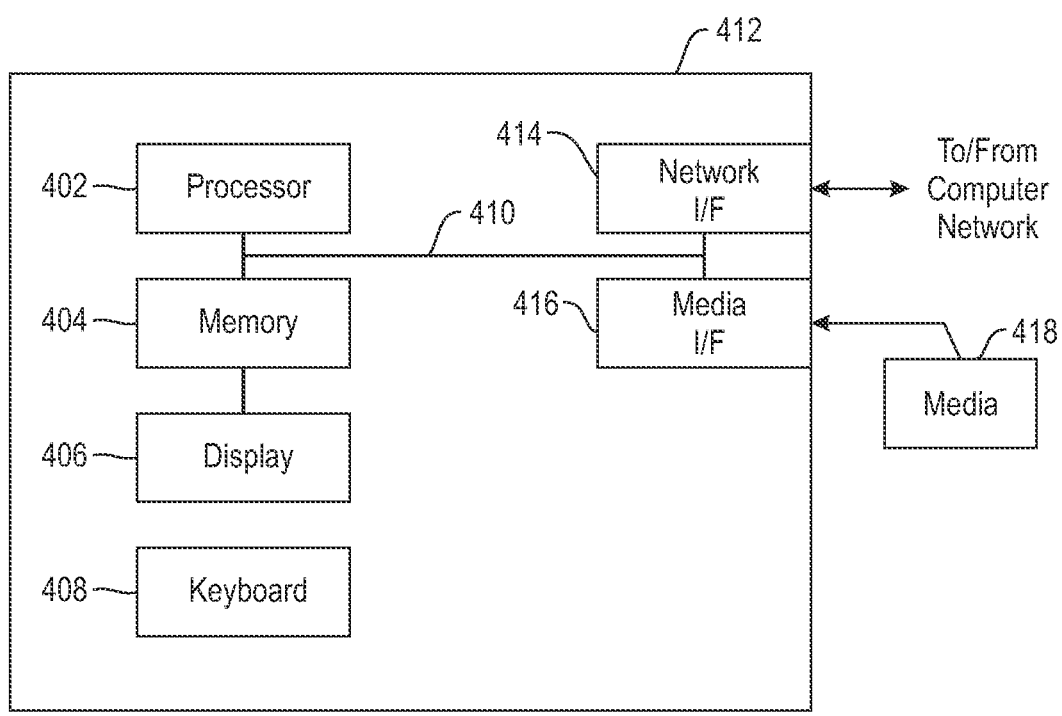
FIG. 4 is a system diagram of an example computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
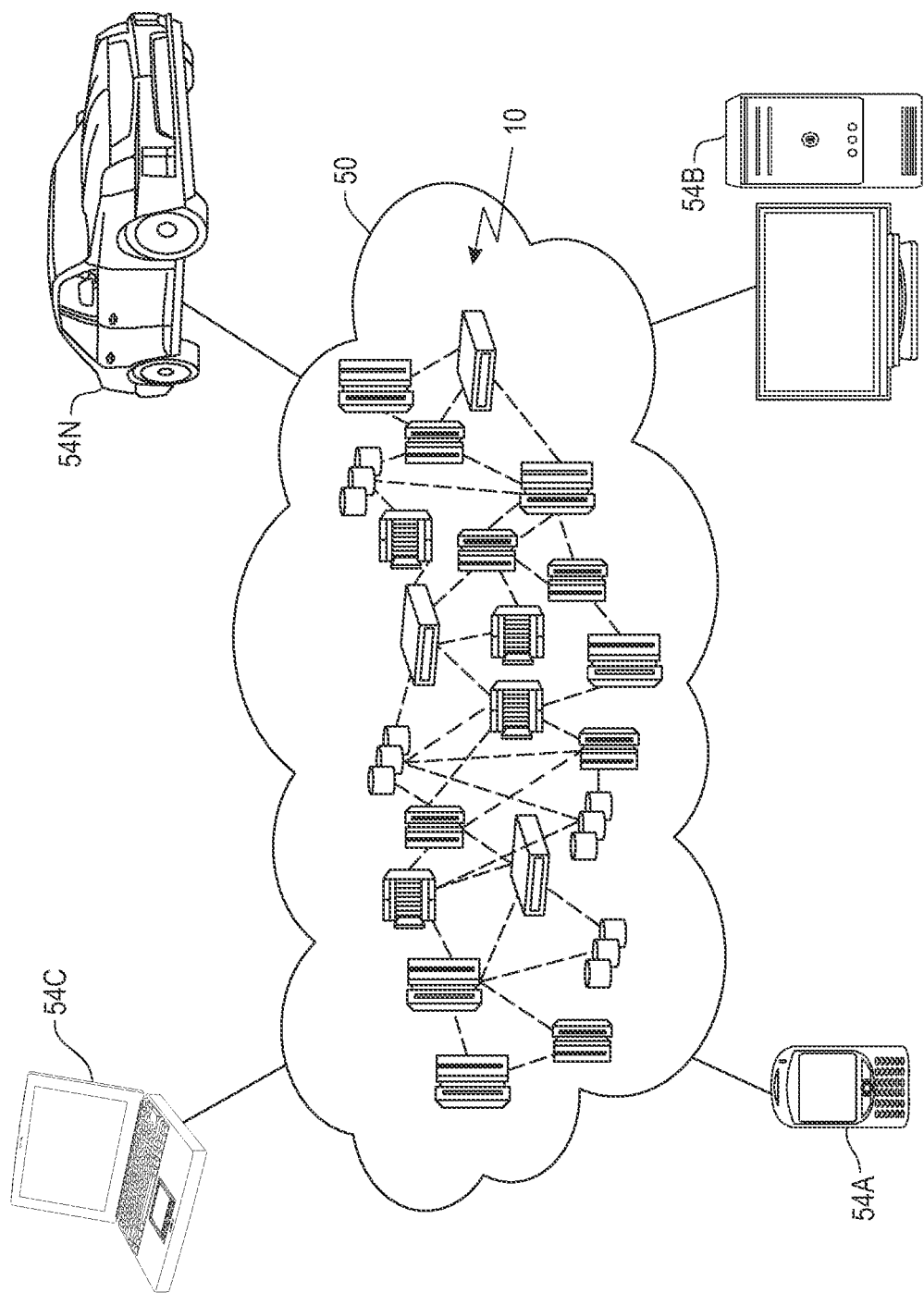
FIG. 5 depicts a cloud computing environment according to an example embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
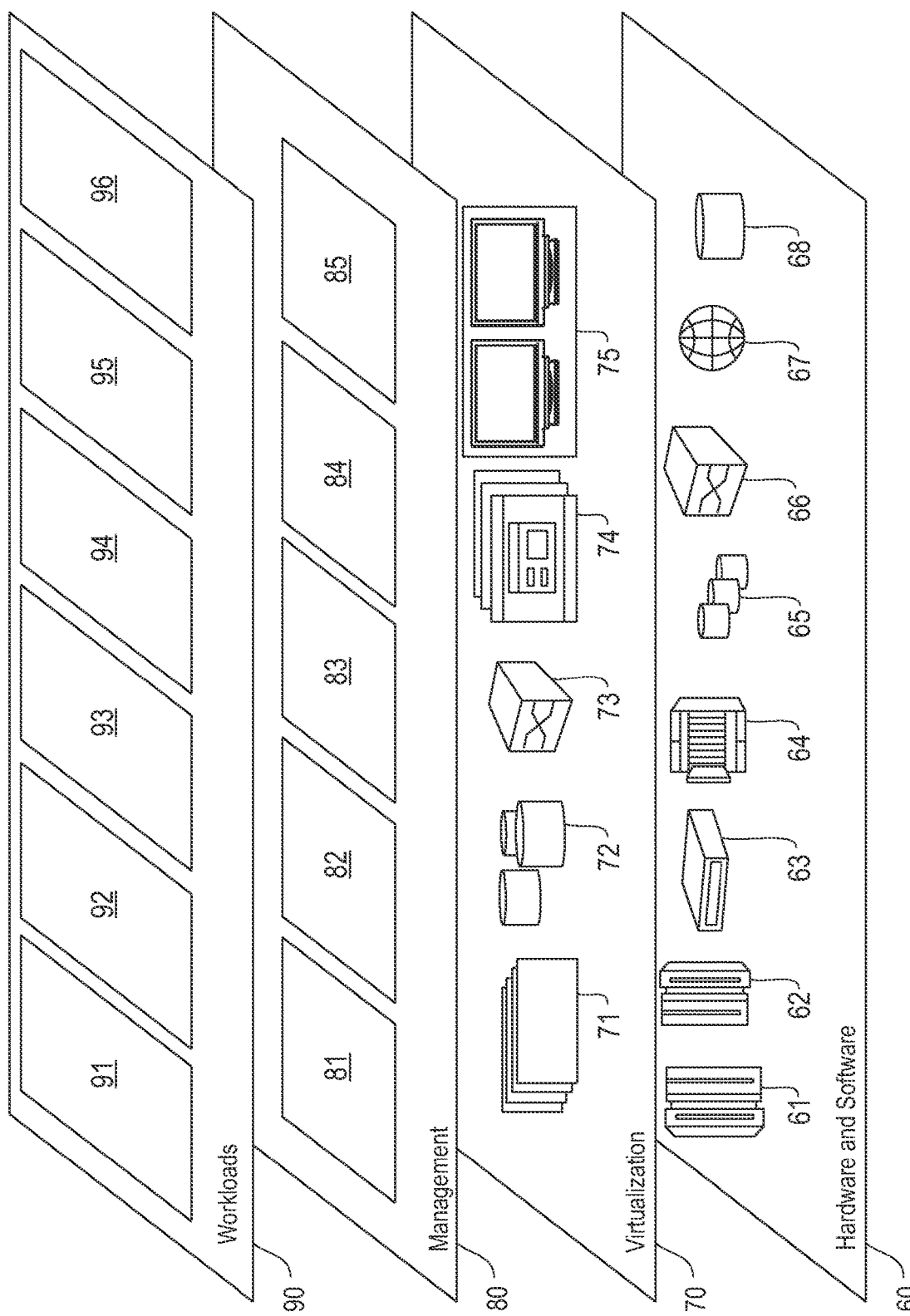
FIG. 6 depicts abstraction model layers according to an example embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and botlet implementation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing automated communication exchange programs for attended RPA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   invoking, during a user communication associated with an attended robotic process automation context, at least one automated communication exchange program in response to at least one user input, wherein invoking at least one automated communication exchange program comprises selecting at least one automated communication exchange program from a collection of multiple automated communication exchange programs, wherein each of the multiple automated communication exchange programs is trained to perform one or more respective tasks, by processing data derived from the user communication and data pertaining to the collection of multiple automated communication exchange programs;
   determining, using the at least one automated communication exchange program, information directed to the at least one user input;
   carrying out, using the at least one automated communication exchange program, at least a portion of the user communication subsequent to determining the information directed to the at least one user input; and
   performing one or more automated actions in connection with automatically carrying out the at least a portion of the user communication;
   wherein the method is carried out by at least one computing device.

2. The computer-implemented method of claim 1, wherein determining information directed to the at least one user input comprises using the at least one automated communication exchange program and one or more application programming interfaces.

3. The computer-implemented method of claim 1, wherein performing one or more automated actions comprises providing one or more text-to-speech formatted updates, pertaining to the automatic carrying out of the at least a portion of the user communication, to at least one agent associated with the user communication.

4. The computer-implemented method of claim 1, wherein performing one or more automated actions comprises enabling agent-override capabilities during the at least a portion of the user communication being carried out using the at least one automated communication exchange program.

5. The computer-implemented method of claim 1, wherein performing one or more automated actions comprises training the at least one automated communication exchange program based at least in part on feedback, from at least one of one or more agents associated with the user communication and one or more communication logs, pertaining to the at least a portion of the user communication being carried out using the at least one automated communication exchange program.

6. The computer-implemented method of claim 1, wherein processing comprises processing data pertaining to the collection of multiple automated communication exchange programs using one or more machine learning techniques.

7. The computer-implemented method of claim 6, wherein using one or more machine learning techniques comprises processing data pertaining to the collection of multiple automated communication exchange programs using reinforcement learning.

8. The computer-implemented method of claim 6, wherein performing one or more automated actions comprises training the one or more machine learning techniques based at least in part on one of the determined information directed to the at least one user input and results of carrying out the at least a portion of the user communication.

9. The computer-implemented method of claim 1, wherein processing comprises processing the data pertaining to the collection of multiple automated communication exchange programs using one or more retrieval models with application programming interface query support.

10. The computer-implemented method of claim 1, wherein processing comprises processing data pertaining to the collection of multiple automated communication exchange programs using one or more generative models with application programming interface query support.

11. The computer-implemented method of claim 1, wherein carrying out the at least a portion of the user communication comprises configuring the at least one automated communication exchange program with one or more delay settings associated with execution speed of the at least one automated communication exchange program.

12. The computer-implemented method of claim 1, wherein software implementing the method is provided as a service in a cloud environment.

13. A computer program product comprising a computer readable storage medium having program instructions embodied therewith, the program instructions executable by a computing device to cause the computing device to:
invoke, during a user communication associated with an attended robotic process automation context, at least one automated communication exchange program in response to at least one user input, wherein invoking at least one automated communication exchange program comprises selecting at least one automated communication exchange program from a collection of multiple automated communication exchange programs, wherein each of the multiple automated communication exchange programs is trained to perform one or more respective tasks, by processing data derived from the user communication and data pertaining to the collection of multiple automated communication exchange programs;
determine, using the at least one automated communication exchange program, information directed to the at least one user input;
carry out, using the at least one automated communication exchange program, at least a portion of the user communication subsequent to determining the information directed to the at least one user input; and
perform one or more automated actions in connection with automatically carrying out the at least a portion of the user communication.

14. The computer program product of claim 13, wherein performing one or more automated actions comprises providing one or more text-to-speech formatted updates, pertaining to the automatic carrying out of the at least a portion of the user communication, to at least one agent associated with the user communication.

15. The computer program product of claim 13, wherein performing one or more automated actions comprises enabling agent-override capabilities during the at least a portion of the user communication being carried out using the at least one automated communication exchange program.

16. The computer program product of claim 13, wherein performing one or more automated actions comprises training the at least one automated communication exchange program based at least in part on feedback, from at least one of one or more agents associated with the user communication and one or more communication logs, pertaining to the at least a portion of the user communication being carried out using the at least one automated communication exchange program.

17. The computer program product of claim 13, wherein processing comprises processing data pertaining to the collection of multiple automated communication exchange programs using one or more machine learning techniques.

18. A system comprising:
a memory configured to store program instructions; and
a processor operatively coupled to the memory to execute the program instructions to:
invoke, during a user communication associated with an attended robotic process automation context, at least one automated communication exchange program in response to at least one user input, wherein invoking at least one automated communication exchange program comprises selecting at least one automated communication exchange program from a collection of multiple automated communication exchange programs, wherein each of the multiple automated communication exchange programs is trained to perform one or more respective tasks, by processing data derived from the user communication and data pertaining to the collection of multiple automated communication exchange programs;
determine, using the at least one automated communication exchange program, information directed to the at least one user input;
carry out, using the at least one automated communication exchange program, at least a portion of the user communication subsequent to determining the information directed to the at least one user input; and
perform one or more automated actions in connection with automatically carrying out the at least a portion of the user communication.

* * * * *